United States Patent [19]

Tam

[11] Patent Number: 5,682,339
[45] Date of Patent: Oct. 28, 1997

[54] METHOD FOR PERFORMING ROTATE THROUGH CARRY USING A 32 BIT BARREL SHIFTER AND COUNTER

[75] Inventor: Hon-Kai John Tam, Sunnyvale, Calif.

[73] Assignee: National Semiconductor Corporation, Santa Clara, Calif.

[21] Appl. No.: 452,162

[22] Filed: May 26, 1995

[51] Int. Cl.$^6$ ............................................... G06F 9/315
[52] U.S. Cl. ............................... 364/715.08; 395/564
[58] Field of Search ..................... 364/715.08; 395/375, 395/564

[56] References Cited

U.S. PATENT DOCUMENTS

| | | | |
|---|---|---|---|
| 5,031,135 | 7/1991 | Patel et al. | 364/745 |
| 5,155,820 | 10/1992 | Gibson | 395/375 |
| 5,189,319 | 2/1993 | Fung et al. | 307/452 |
| 5,204,953 | 4/1993 | Dixit | 395/400 |
| 5,254,888 | 10/1993 | Lee et al. | 307/480 |
| 5,259,006 | 11/1993 | Price et al. | 375/107 |
| 5,282,153 | 1/1994 | Bartkowiak et al. | 364/715.08 |
| 5,379,240 | 1/1995 | Byrne | 364/715.08 |
| 5,404,473 | 4/1995 | Papworth et al. | 395/375 |
| 5,408,626 | 4/1995 | Dixit | 395/400 |
| 5,553,010 | 9/1996 | Tanihira et al. | 364/715.08 |
| 5,555,202 | 9/1996 | Chu | 364/715.08 |
| 5,559,730 | 9/1996 | Marvi et al. | 364/715.08 |

OTHER PUBLICATIONS

IBM Technical Disclosure Bulletin, vol. 26 #12 May 1984, New York US, pp. 6251–6252, F.J. Kriss et al: "Rotate Right Through Carry ALU Function".

Kane, Gerry, "R2000 Processor Programming Model", Chapter 2, *MIPS RISC Architecture*, MIPS Computer Systems, Inc.

Hennessy, John, et al., "Interpreting Memory Addresses", *Computer Architecture A Quantitative Approach*, pp. 95–97, Morgan Kaufmann Publishers, Inc. 1990.

*PowerPC601 Reference Manual*, IBM, 1994, Chapter 9, "System Interface Operation", pp. 9–15 thru 9–17.

Intel Corp. Microsoft Corp., *Advanced Power Management (APM) BIOS Interface Specification*, Revision 1.1, Sep. 1993.

Intel Corporation, *i486 Micro Processor Hardware Reference Manual*, Processor Bus, pp. 3–28 thru 3–32.

Serra, Micaela & Dervisoglu, Bulent I, "Testing", Chapter 79, *The Electrical Engineering Handbook*, Richard C. Dorf, Editor-in-Chief, pp. 1808–1837, CRC Press.

L-T Wang et al., "Feedback Shift Registers For Self-Testing Circuits", *VLSI Systems Design*, Dec. 1986.

Masakazu Shoji, "CMOS Dynamic Gates", Chapter 5, *AT&T CMOS Digital Circuit Technology*, Prentice Hall, 1988, pp. 210–257.

Guthrie, Charles, "Power–On Sequencing For Liquid Crystal Displays; Why, When, And How", *Sharp Application Notes*, Sharp Corporation, 1994, pp. 2–1 thru 2–9.

Bernd Moeschen, "NS32SP160—Feature Communication Controller Architecture Specification", *National Semiconductor*, Rev. 1.0, May 13, 1993.

Agarwal, Rakesh K., *80x86 Architecture and Programming, Vol. II: Architecture Reference*, Chapter 4, Prentice Hall, 1991, pp. 542–543.

Intel486 Microprocessor Family Programmer's Reference Manual, Intel Corporation, 1993.

"8237A High Performance Programmable DMA Controller (8237A, 8237A-4, 8237A-5)", *Peripheral Components*, Intel, 1992, pp. 3–14 thru 3–50.

*Primary Examiner*—David H. Malzahn
*Attorney, Agent, or Firm*—Limbach & Limbach, LLP

[57] ABSTRACT

A method for performing a rotate through carry operation utilizing a barrel shifter and a counter.

2 Claims, 8 Drawing Sheets hOF.D --- D input of the hidden overflow flag register
hSF.D --- D input of the hidden sign flag register
hZF.D --- D input of the hidden zero flag register
hAF.D --- D input of the hidden auxiliary flag register
hPF.D --- D input of the hidden parity flag register
hCF.D --- D input of the hidden carry flag register at every rising clockedge
 hOF.Q = hOF.D
 hSF.Q = hSF.D
 hZF.Q = hZF.D
 hAF.Q = hAF.D
 hPF.Q = hPF.D
 hCF.Q = hCF.D

OF.Q = OF.D
 SF.Q = SF.D
 ZF.Q = ZF.D
 AF.Q = AF.D
 PF.Q = PF.D
 CF.Q = CF.D size of tempreg.Q = 8 bit for BYTE
 16 bit for WORD
 32 bit for DWORD
tempreg.Q = operand to be rotated (start)

302 —
Operand A = don't care
Operand B = 8 bit shift amount (BYTE)
temp1.D = 32 bit zero extended 3 operand (Double Word)
hOF.D = OF.Q
hSF.D = SF.Q
hZF.D = ZF.Q
hAF.D = AF.Q
hPF.D = PF.Q
hCF.D = CF.Q clock 304 —
Operand A = temp1.Q (Double Word)
Operand B = 0 (Double Word)
Upper.D = operand A         (upper register)
Lower.D = operand B         (lower register)
Upper_bits0to4 = lower 5bits of upper.D
hSF.D    SF.Q
hAF.D = AF.Q
hCF.D = CF.Q
hPF.D = D (A)

FIG. 6a

METHOD FOR PERFORMING ROTATE THROUGH CARRY USING A 32 BIT BARREL SHIFTER AND COUNTER

BACKGROUND OF THE INVENTION

The present invention relates generally to microprocessor architecture, and more particularly to a method for using a portion of the microprocessor execution unit architecture to perform a rotate through carry operation.

Many modern microprocessors have a "pipelined architecture" whereby the processor is divided into stages. This permits the processor to perform several tasks at once thereby allowing the processor to work on different parts of the instructions simultaneously as they are advanced through the pipe with each clock cycle. Under ideal conditions, one instruction can leave the pipeline and another instruction enter the pipeline every clock cycle. One such microprocessor is the Intel486™ microprocessor. Compatible x86-type microprocessors include those made by Advanced Micro Devices and Cyrix.

Arising out of the need for compatibility with older Intel microprocessor designs and the fact that it is a general purpose microprocessor, the x86 microprocessor has a complex instruction set architecture which includes over 400 instructions. However, some of these instructions are rarely used by either the operating system or the compiler. Thus, it would be desirable to optimize the architecture for commonly used instructions.

SUMMARY OF THE INVENTION

A method for using for a microprocessor execution unit architecture to perform a rotate through carry operation is disclosed. The architecture is generally described as having an arithmetic unit and an addressing unit. The arithmetic unit performs arithmetic and logical operations on a pair of operands in response to control signals. The addressing unit operates in conjunction with the arithmetic unit to calculate linear addresses as well as offsets and limits.

The arithmetic unit includes a first portion for performing addition, subtraction and logical operations, a second portion for performing multiply, divide and single-bit shift operations, and a third portion for performing multi-bit shift and rotate operations.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

FIGS. 6a–6c are flow charts illustrating how a rotate and carry operation is performed.

DETAILED DESCRIPTION OF THE INVENTION

Figure 1:
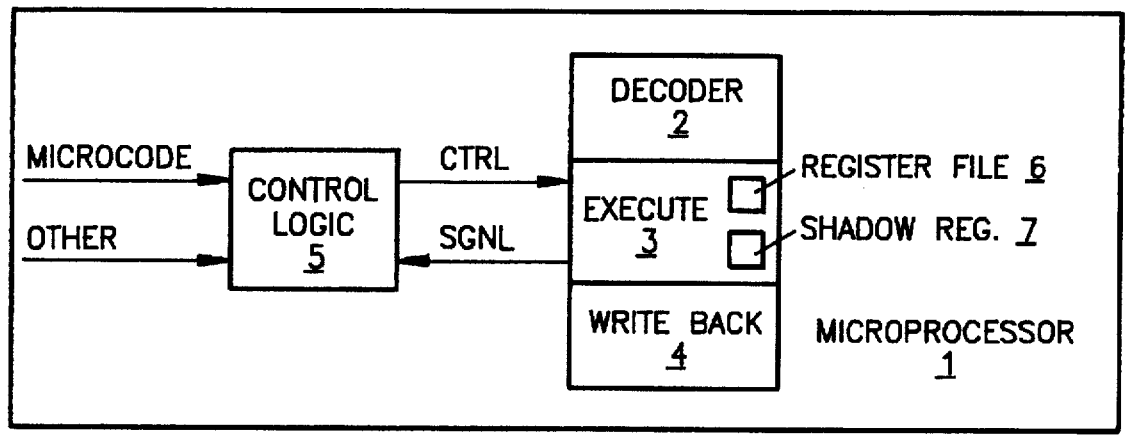
FIG. 1 is a block diagram showing portions of an integrated microprocessor system.

Referring now to FIG. 1, the preferred embodiment of the present invention is an integrated microprocessor system 1 having a pipelined architecture, wherein the pipeline includes, for example, a decoder stage 2, an execution unit 3 and a writeback stage 4. The present disclosure is directed to the execution unit 3, which provides a 32-bit data path for operands and instructions stored in general registers, including register file 6 and shadow register 7, and wherein arithmetic, logical and addressing computations are performed by the execution unit for programming instructions executed by the integrated microprocessor system 1.

The microprocessor system 1 includes a control logic unit 5 which is coupled to send control signals CTRL to the execution unit 3 and to receive data signals SGNL from the execution unit. The control logic unit 5 is also coupled to other components of the microprocessor system 1 and receives microcode and other input for making programmed control decisions.

The execution unit 3 is implemented to be substantially compatible with the Intel x86 instruction set, as set forth in the "Intel486™ MICROPROCESSOR FAMILY PROGRAMMER'S REFERENCE MANUAL," which is expressly incorporated herein by reference. The x86 instructions will be referenced herein in their common mnemonic form, such as ADD, SUB, MUL, DIV, etc.

Figure 2:
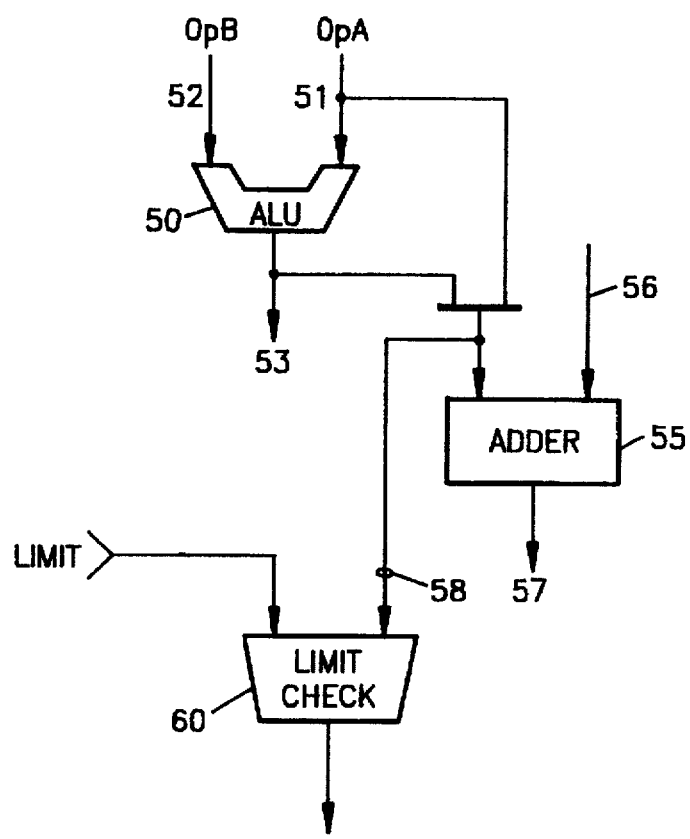
FIG. 2 is a functional block diagram of the execution unit portion of the integrated microprocessor system of FIG. 1.

A simplified functional diagram of the execution unit 3 is shown in FIG. 2. An arithmetic unit 50 has two inputs 51 and 52 for receiving operands OpA and OpB, respectively, from register file 6. The arithmetic unit 50 generates an arithmetic or logical result 53 in a single cycle for many x86 instructions.

The arithmetic unit 50 includes a first portion for performing addition, subtraction and logical operations, a second portion for performing multiply, divide and single-bit shift operations, and a third portion for performing multi-bit shift and rotate operations, as will be shown and described in more detail below.

An addressing unit 55 has one input selectively coupled to the output of the arithmetic unit 50 or to OpA. When an addressing instruction is received, the segment base component is provided to the addressing unit 55 on input 56, and the base, index, or displacement components, or immediate segment address operands, are provided to the arithmetic unit 50 on inputs 51 and 52. The addressing unit 55 then sums the address components to yield output 57 which is a linear address.

A limit check unit 60 is provided to make sure the offset 58, i.e., output 53 or OpA, is not addressing a location outside of the segment as determined by the control signal LIMIT.

Figure 3:
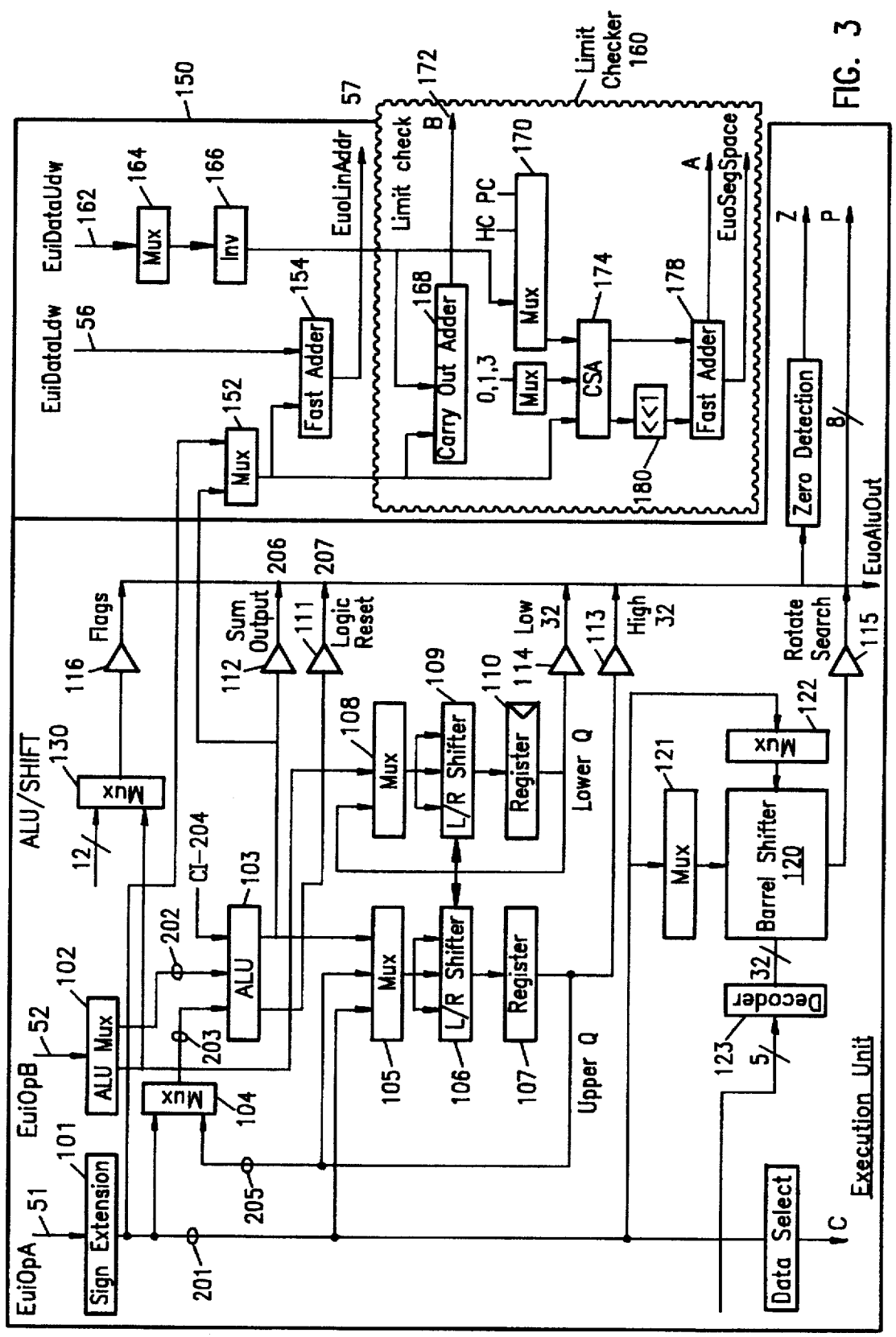
FIG. 3 is a more detailed block diagram of the execution unit of FIG. 2.
Figure 4:
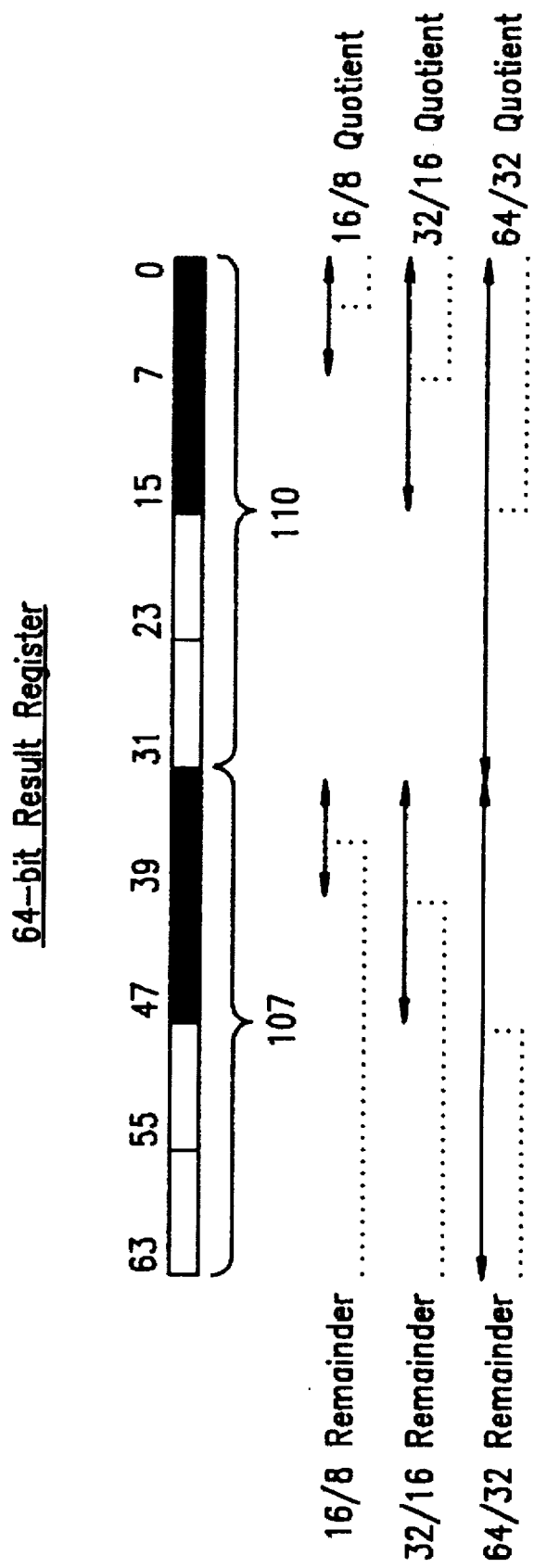
FIG. 4 is a schematic diagram of the result registers for a division operation.

Referring now to FIG. 3, the execution unit 3 is illustrated in greater detail. It should be apparent to one versed in the art that each component of the execution unit described below is controlled or selected by one or more control signals provided by the control logic unit 5. However, a detailed description of these control signals in not necessary for a complete understanding of the invention.

Operand A is received into a sign extension unit 101. Sign extension unit 101 is a 3:1 multiplexor that selects a byte and sign extends it into 32 bits, or selectes a word and sign extends it into 32 bits, or selects a dword, and then outputs the 32 bit result $a_{in}$ onto data line 201. The term "sign extend" means copying the sign bit into the 24 highest order bits for a byte or into the 16 highest order bits for a word.

Operand B is received into a sign extension unit 102. Sign extension unit 102 includes a 5:1 multiplexor that selects a signed byte and sign extends it into 32 bits, or a signed word and sign extends it into 32 bits, or an unsigned byte and sign extends it into 32 bits, or an unsigned word and sign extends it into 32 bits, or a dword. The output 202 is a 32 bit result $b_{in}$. Sign extension unit 102 also includes a 2:1 multiplexor that selects OpB or its complement.

An adder 103 receives and operates upon data lines 202 and 203 and carry input CI 204. Data line 203 is from the output of a 2:1 multiplexor 104, which selects either $a_{in}$ data line 201 or UpperQ data line 205.

Adder 103 performs logical operations on data lines 202 and 203 to generate logic output 207, which is available to the user through output gate 111. The adder 103 also performs addition on data lines 202, 203 and 204 to generate sum output 206, which is available to the user through output gate 112.

Two 32 bit registers are provided for performing multiply, divide and single-bit shift operations. For the upper 32 bits, a 3:1 multiplexor 105 selects from $a_{in}$ data line 201, UpperQ data line 205, or SUM data line 207. The selected value may be shifted either left or right by one bit by left/right shifter 106 and then stored in register 107. For the lower 32 bits, a 2:1 multiplexor 108 selects from $b_{in}$ data line 202 or from LowerQ data line 208. The selected value may be shifted either left or right by one bit by left/right shifter 109 and then stored in register 110. The least significant bit (LSB) of left/right shifter 106 is coupled to the most significant bit (MSB) of left/right shifter 109 to permit up to 64 single bit position shifts.

The UpperQ register 107 provides an output data line 205 which is fed back to multiplexor 104 or multiplexor 105, as described above, or made available to the user through output gate 113. The LowerQ register 110 provides an output data line 208 which is fed back to multiplexor 108 as described above, or available to the user through output gate 114.

A barrel shifter 120 comprising a 32 by 32 transistor array is provided for performing multi-bit shift and rotate operations. A pair of 32 bit 2:1 multiplexors 121, 122 couple the $a_{in}$ data line 201 to the barrel shifter 120. A 5 bit decoder 123 provides 32 output signals, only one of which is true, to the barrel shifter 120, thus selecting one row of the barrel shifter. The output 209 of the barrel shifter 120 is available to the user through output gate 115.

A multiplexor 130 selectively outputs status flags from the execution unit 3 through output gate 116, as shown in Table I:

TABLE I

| Flag | Function |
| --- | --- |
| CF | Carry flag: Carry or Borrow from most-significant bit |
| PF | Parity Flag: Exclusive NOT of lower 8 bits of result |
| AF | Auxiliary Flag: Carry of Borrow from bit 8 |
| ZF | Zero Flag: Zero result set ZF to 1; else ZF is cleared |
| SF | Sign Flag: set to most-significant bit of result |
| OF | Overflow Flag: set to 1 is two's complement overflow occurs; else cleared |

The addressing unit includes a 4:1 multiplexor 152 that selects the $a_{in}$ data line 201 if it is a dword, or zero extends the $a_{in}$ data line 201 if it is a word, or the SUM output 206 if a dword, or zero extends the SUM output if a word. The term "zero extend" means copying a zero into the 24 highest order bits for a byte or into the 16 highest order bits for a word.

An adder 154 receives the output from multiplexor 152 as well as the segment base value on data line 56 and adds the two values together, thereby generating a linear address 57.

A limit check unit 160 is also provided in execution unit 3. The address includes a 20 bit limit value 162 which is stored in the shadow register 7. This limit value is provided to multiplexor 164, where it is scaled to 32 bits, depending on the value of the granularity bit, then inverted through 32 bit inverter 166. The output of inverter 166 is coupled to an adder 168, in which only the carry out function is used, and to a multiplexor 170. The output of multiplexor 152 is also coupled to adder 168. The output B of adder 168 indicates that the offset is below the scaled limit value.

The multiplexor 170 is provided with constants HC (half ceiling) and FC (full ceiling), which provide the maximum value for addressing computations and cause selection of either 16 bit addresses (HC) or 32 bits addresses (FC). The output of multiplexor 170, which is the upper limit for address computations, is fed to adder 174, which is a carry save adder (CSA). Additional inputs to CSA 174 are from multiplexor 152 and multiplexor 176. Additional constant inputs 0, 1 and 3 are provided to the multiplexor 176 to define the instruction length, i.e., 0=byte, 1=word, and 3=dword.

The output of CSA 174 is fed to the input of adder 178 and to a single bit left shift unit 180, which effectively multiplies the value of the carry bits by 2. The output of shift unit 180 is fed to the adder 178. The output SegSpace of adder 178 is used for a limit calculcation by a prefetch unit (not shown) and the output A of adder 178 indicates that the offset in above the scaled limit value.

The operation of execution unit 3 for arithmetic and logical instructions will now be described in more detail.

Instructions for addition, subtraction, and logical operations are carried out in a conventional manner by utilizing the resources of adder 103.

Instructions for multiplication and division are carried out by using the adder 103, the upper shifter comprising multiplexor 105, shifter 106 and register 107, and the lower shifter comprising multiplexor 108, shifter 109 and register 110. Generally, most multiplication and division instructions are performed according to conventional algorithms, i.e., shift and add for multiplication, and subtract and shift for division operations.

For a division operation, if the value of $a_{in}$ is greater than the value stored in registers 107, 110, then 0 is entered and the shifter is selected, else 1 is entered and the adder 103 is selected. For a multiplication operation, if OpA equals 1, then the adder 103 is selected, else the shifter is selected.

A division example of 50 by 7 yields a quotient of 7 with a remainder of 1, as shown in Table II (truncated to 8 bits):

TABLE II

| Cycle | Register 107 + 110 | Shifter 106 + 109 | Adder 103 |
| --- | --- | --- | --- |
| 1 | 0011 0010 | 0110 0100 | 1111 |
| 2 | 0110 0100 | 1100 1001 | 0101 |
| 3 | 0101 1001 | 1011 0011 | 0100 |
| 4 | 0100 0011 | 1000 0111 | 0001 |
| 5 | 0001 0111 | xxxx xxxx | xxxx |

Figure 5:
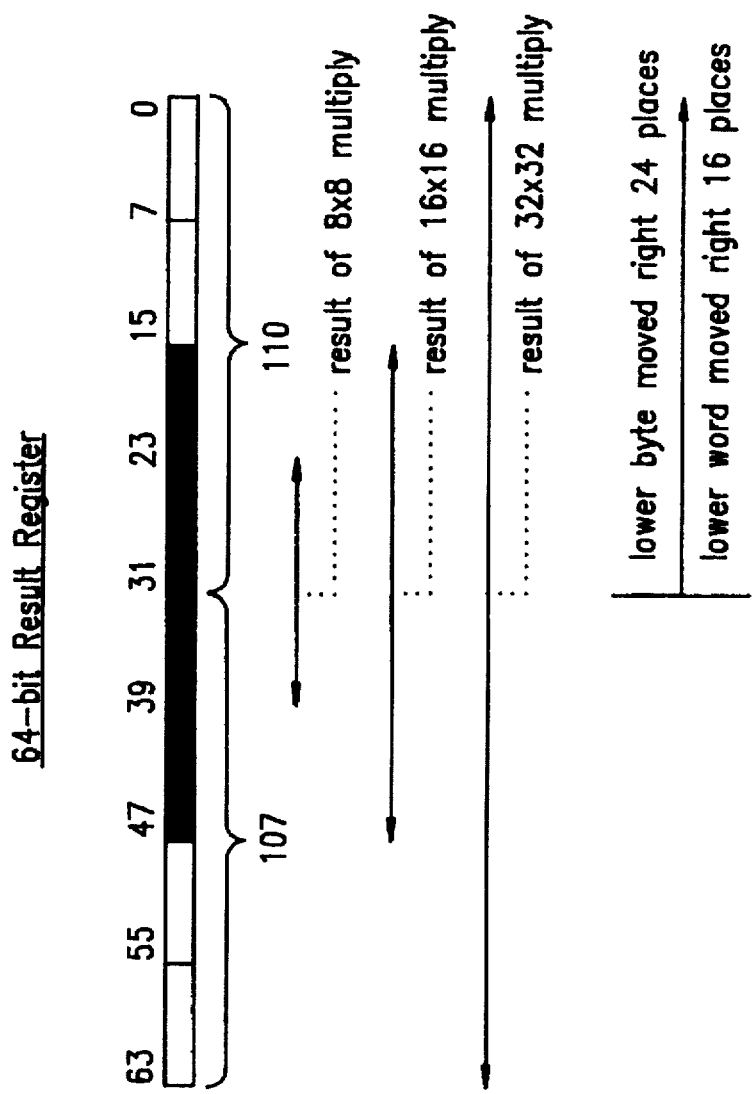
FIG. 5 is a schematic diagram of the result registers for a multiplication operation.

Register 110 is used to provide the quotient while register is used to provide the remainder, as illustrated in FIG. 5. Thus, for byte operations, the lower 8 bits of register 110 contain the quotient while the lower 8 bits of register 107 contain the remainder. For word operations, the lower 16 bits of register 110 contain the quotient while the lower 16 bits of register 107 contain the remainder. For dword operations, all 32 bits of register 110 contain the quotient while all 32 bits of register 107 contain the remainder.

Further discussion of the IDIV instruction can be found in commonly assigned, copending U.S. application Ser. No. 08/431,571 entitled "METHOD FOR PERFORMING SIGNED DIVISION" by H. John Tam and filed on May 26, 1995.

A multiplication example of 10 by 5 yields a product of 50, as shown in Table III (truncated to 8 bits):

TABLE III

| Cycle | Register 107 + 110 | Shifter 106 + 109 | Adder 103 |
|---|---|---|---|
| 1 | 0000 0000 | 0000 0000 | 1111 |
| 2 | 1010 0000 | 0101 0000 | 0101 |
| 3 | 0101 0000 | 0010 1000 | 0100 |
| 4 | 1100 1000 | 0110 0100 | 0001 |
| 5 | 0110 0100 | 0011 0010 | 1101 |
| 6 | 0011 0010 | xxxx xxxx | xxxx |

The product of a multiplication operation is contained in registers 110 and 107 as illustrated in FIG. 5. Thus, for byte operations, a 16-bit result is contained in the upper 8 bits of register 110 and the lower 8 bits of register 107. For word operations, a 32-bit result is contained in the upper 16 bits of register 110 and the lower 16 bits of register 107. For dword operations, a 64-bit result is contained in all 32 bits of register 110 and all 32 bits of register 107.

The barrel shifter 120 and associated multiplexors 121 and 122 may be used to carry out multi-bit shift and rotate operations such as rotate and carry, as will now be described in more detail.

Figure 6B:
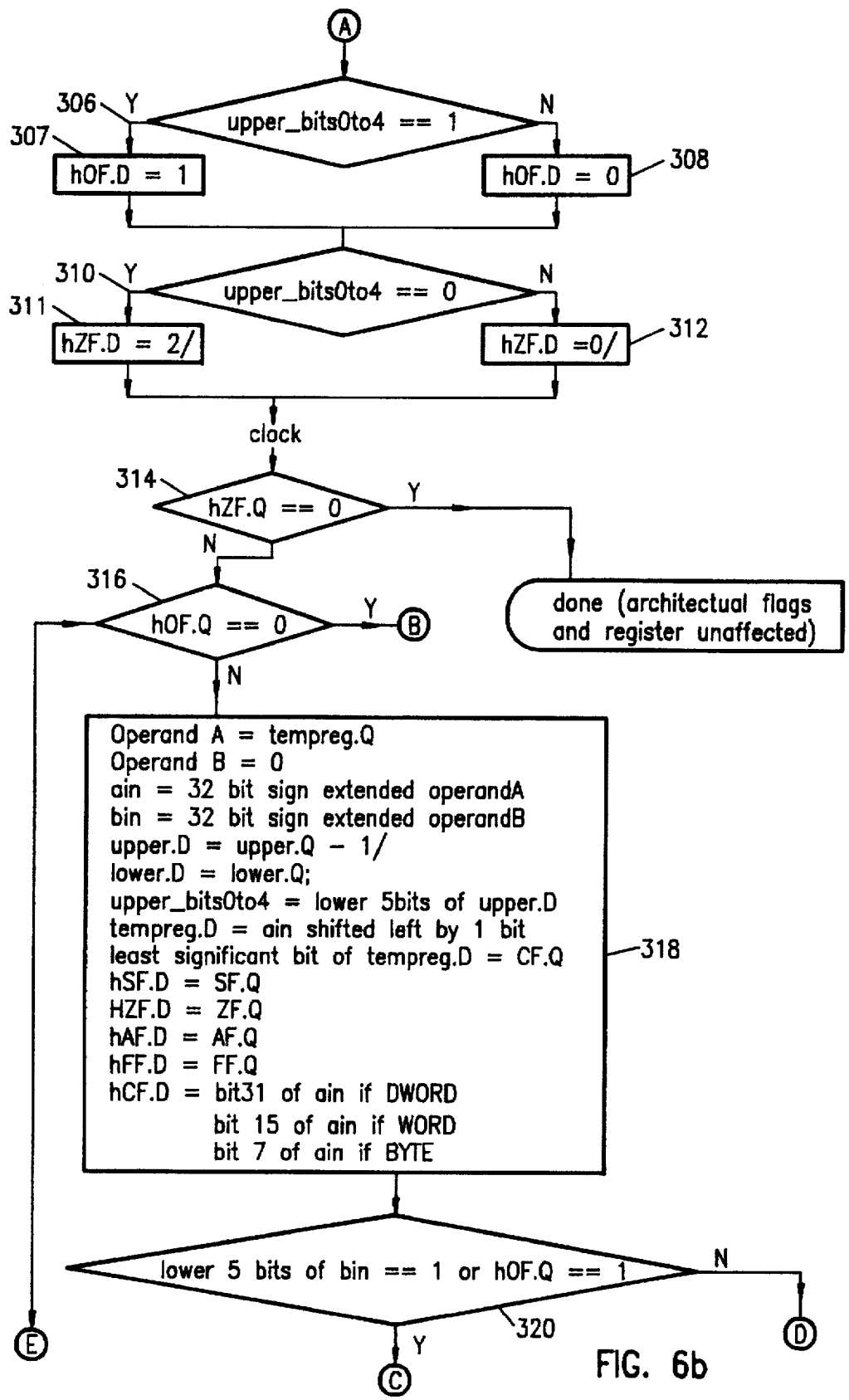
Figure 6C:
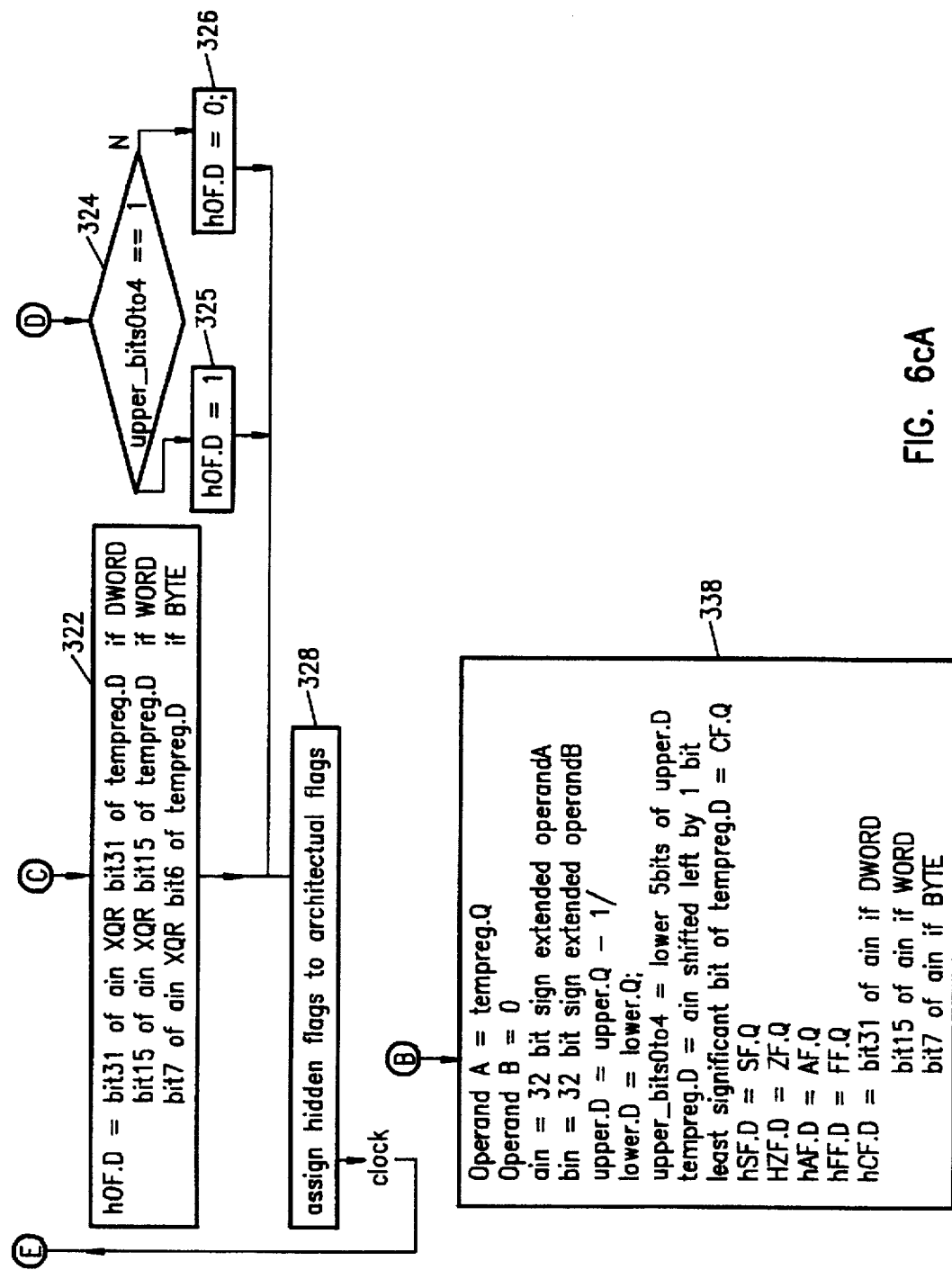
Figure 6C:
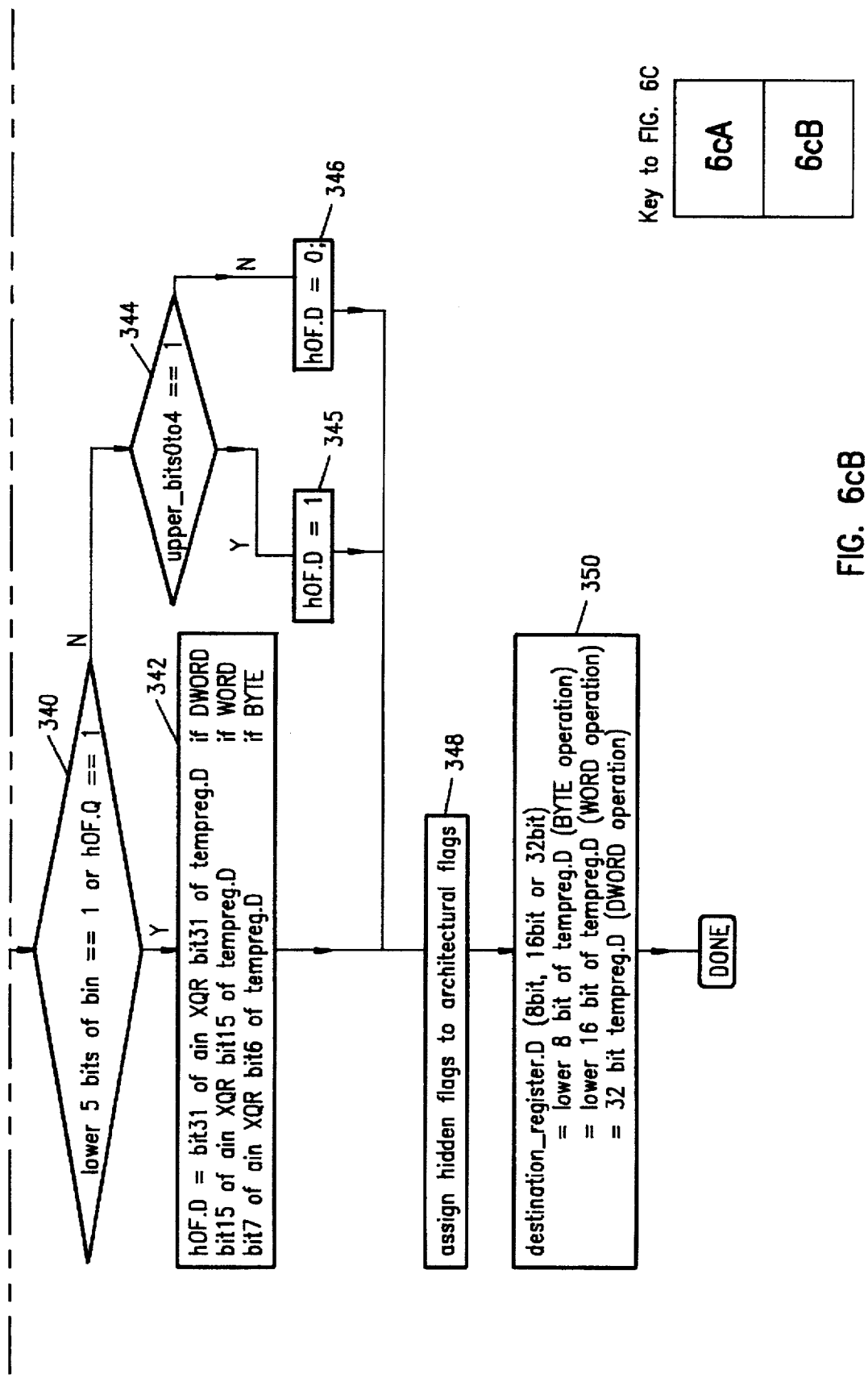

For example, the RCL instruction (rotate through carry left) is illustrated in FIGS. 6a–6c. In step 302, the MVSX instruction takes the 8 bit shift amount stored in operand B and moves it to a temporary register temp1, where it is zero extended to 32 bits. A set of hidden status flags are defined for internal use and are initially set equal to the user status flags. This step takes one clock cycle.

In step 304, an LDS instruction loads the 32 bit value from temporary register temp1 to Operand A and loads Operand B with 32 zeros. These values are also loaded into upper register 107 and lower register 110, respectively. The hidden flags hSF, hAF, and hAF are again updated by setting them equal to the user flags. The hidden parity flag hPF is set to zero. The hidden overflow flag hOF and the hidden zero flag are handled in the next few steps.

In step 306, the least significant 5 bits, i.e., bits 0 to 4, of the upper register 107 are compared to the value one. If these bits equal 1, then the hidden overflow flag hOF is set to 1 in step 307, otherwise, the hidden overflow flag hOF is set to 0 in step 308.

In step 310, the least significant 5 bits, i.e., bits 0 to 4, of the upper register 107 are compared to the value zero. If these bits equal 0, then the hidden zero flag hZF is set to 1 in step 311, otherwise, the hidden zero flag hZF is set to 0 in step 312.

Steps 304 to 312 take another clock cycle.

In step 314, the hidden zero flag hZF is compared to zero. If true, then the routine is done and the architectural flags and registers are unaffected. If not zero, however, the hidden overflow flag hOF is compared to zero in step 316.

If hOF is zero, the program jumps to step 338. Otherwise, the program proceeds to step 318, where operand A is loaded with the value stored in temporary register tempreg and then sign extended to 32 bits $a_{in}$, and Operand B is loaded with zero and sign extended to 32 bits $b_{in}$. The value stored in upper register 107 is decremented by one, and the value $a_{in}$ is shifted left by one bit position and stored in tempreg. The least significant bit on tempreg is set equal to the value of the carry flag CF. The hidden flags hSF, hZF, hAF, and hPF are then updated by setting them equal to the corresponding user flags. The hidden carry flag hCF is then set equal to bit 31 of $a_{in}$ if it is a dword, or to bit 15 of $a_{in}$ if it is a word, or to bit 7 of $a_{in}$ if it is a byte.

In step 320, if the lower 5 bits of $b_{in}$ equal 1, or if the hidden overflow flag hOF equals 1, then proceed to step 322, otherwise jump to step 324.

In step 322, the hidden overflow flag hOF is set to bit 31 of $a_{in}$ XOR bit 31 of tempreg if it is a dword, or to bit 15 of $a_{in}$ XOR bit 15 of tempreg if it is a word, or to bit 7 of $a_{in}$ XOR bit 7 of tempreg if it is a byte.

In step 324, the lower 5 bits of upper register 107 are compared to 1. If they are equal to one, then the hidden overflow flag hOF is set equal to one in step 325, otherwise the hidden overflow flag hOF is set equal to zero in step 326.

In step 328, all the user flags are set equal to the hidden flags and the program returns to step 316.

Step 338 begins the routine for when hOF was 0 in step 316. This routine is identical to steps 318 to 328, but adds step 350 at the end, wherein the result is stored in a destination register and is equal to the lower 8 bits of tempreg if a byte, the lower 16 bits of tempreg if a word, and the lower 32 bits if a dword.

Other uses for this hardware are more fully described in the following commonly assigned, copending applications: U.S. application Ser. No. 08/451,444, entitled "BARREL SHIFTER" by Thomas W. S. Thomson and H. John Tam as filed on May 26, 1995; and U.S. application Ser. No. 08/451,204 entitled "BIT SEARCHING THROUGH 8, 16, OR 32-BIT OPERANDS USING A 32-BIT DATA PATH" by Thomas W. S. Thomson as filed on May 26, 1995.

Double precision shift operations are also fully supported by the execution unit 3, as more fully described in commonly assigned, copending application Ser. No. 08/451,195 entitled "DOUBLE PRECISION (64-BIT) SHIFT OPERATIONS USING A 32-BIT DATA PATH" by Thomas W. S. Thomson and filed on May 26, 1995.

Addressing computations for x86 segmented address space are optimized in execution unit 3 for the predominant cases, i.e., where the address consists only of two components, namely a scaled index and a displacement, or a base and a displacement. The execution unit is capable of performing the entire address computation in a single cycle, i.e., it can perform calculate the offset, the linear address and the limit in a single cycle.

The invention embodiments described herein have been implemented in an integrated circuit which includes a number of additional functions and features which are described in the following co-pending, commonly assigned patent applications, the disclosure of each of which is incorporated herein by reference: U.S. patent application Ser. No. 08/451,319 entitled DISPLAY CONTROLLER CAPABLE OF ACCESSING AN EXTERNAL MEMORY FOR GRAY SCALE MODULATION DATA; U.S. patent application Ser. No. 08/451,965, entitled SERIAL INTERFACE CAPABLE OF OPERATING IN TWO DIFFERENT SERIAL DATA TRANSFER MODES; U.S. patent application Ser. No. 08/453,076, entitled HIGH PERFORMANCE MULTI-FUNCTION DIRECT MEMORY ACCESS (DMA) CONTROLLER; U.S. patent application Ser. No. 08/452, 001, now abandoned, entitled OPEN DRAIN MULTI-SOURCE CLOCK GENERATOR HAVING MINIMUM PULSE WIDTH; U.S. patent application Ser. No. 08/451,503, entitled INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION; U.S. patent application Ser. No. 08/451,924, entitled EXECUTION UNIT ARCHITECTURE TO SUPPORT x86 INSTRUCTION SET AND x86 SEGMENTED ADDRESSING; U.S. patent application Ser. No. 08/451,444, entitled BARREL SHIFTER; U.S. patent application Ser. No. 08/451,204, entitled BIT SEARCHING THROUGH 8, 16, OR 32-BIT OPERANDS USING A 32-BIT DATA PATH; U.S. patent application Ser. No. 08/451,195, entitled DOUBLE PRECISION (64-BIT) SHIFT OPERATIONS USING A 32-BIT DATA PATH; U.S. patent application Ser. No. 08/451,571, entitled METHOD FOR PERFORMING SIGNED DIVISION; U.S. patent application Ser. No. 08/452,162, entitled METHOD FOR PERFORMING ROTATE THROUGH CARRY USING A 32-BIT BARREL SHIFTER AND COUNTER; U.S. patent application Ser. No. 08/451,434, entitled AREA AND TIME EFFICIENT FIELD EXTRACTION CIRCUIT; U.S. patent application Ser. No. 08/451,535, entitled NON-ARITHMETICAL CIRCULAR BUFFER CELL AVAILABILITY STATUS INDICATOR CIRCUIT; U.S. patent application Ser. No. 08/445,563, entitled TAGGED PREFETCH AND INSTRUCTION DECODER FOR VARIABLE LENGTH INSTRUCTION SET AND METHOD OF OPERATION; U.S. patent application Ser. No. 08/450,153, now U.S. Pat. No. 5,546,353, entitled PARTITIONED DECODER CIRCUIT FOR LOW POWER OPERATION; U.S. patent application Ser. No. 08/451,495, entitled CIRCUIT FOR DESIGNATING INSTRUCTION POINTERS FOR USE BY A PROCESSOR DECODER; U.S. patent application Ser. No. 08/451,219, now U.S. Pat. No. 5,598,112, entitled CIRCUIT FOR GENERATING A DEMAND-BASED GATED CLOCK; U.S. patent application Ser. No. 08/451,214, now U.S. Pat. No. 5,583,453, entitled INCREMENTOR/DECREMENTOR; U.S. patent application Ser. No. 08/451,150, entitled A PIPELINED MICROPROCESSOR THAT PIPELINES MEMORY REQUESTS TO AN EXTERNAL MEMORY; U.S. patent application Ser. No. 08/451,198, entitled CODE BREAKPOINT DECODER; U.S. patent application Ser. No. 08/445,569, entitled TWO TIER PREFETCH BUFFER STRUCTURE AND METHOD WITH BYPASS; U.S. patent application Ser. No. 08/445,564, entitled INSTRUCTION LIMIT CHECK FOR MICROPROCESSOR; U.S. patent application Ser. No. 08/452,306, entitled A PIPELINED MICROPROCESSOR THAT MAKES MEMORY REQUESTS TO A CACHE MEMORY AND AN EXTERNAL MEMORY CONTROLLER DURING THE SAME CLOCK CYCLE; U.S. patent application Ser. No. 08/452,080, entitled APPARATUS AND METHOD FOR EFFICIENT COMPUTATION OF A 486™ MICROPROCESSOR COMPATIBLE POP INSTRUCTION; U.S. patent application Ser. No. 08/450,154, entitled APPARATUS AND METHOD FOR EFFICIENTLY DETERMINING ADDRESSES FOR MISALIGNED DATA STORED IN MEMORY; U.S. patent application Ser. No. 08/451,742, entitled METHOD OF IMPLEMENTING FAST 486™ MICROPROCESSOR COMPATIBLE STRING OPERATION; U.S. patent application Ser. No. 08/452,659, entitled A PIPELINED MICROPROCESSOR THAT PREVENTS THE CACHE FROM BEING READ WHEN THE CONTENTS OF THE CACHE ARE INVALID; U.S. patent application Ser. No. 08/451,507, now abandoned, entitled DRAM CONTROLLER THAT REDUCES THE TIME REQUIRED TO PROCESS MEMORY REQUESTS; U.S. patent application Ser. No. 08/451,420, entitled INTEGRATED PRIMARY BUS AND SECONDARY BUS CONTROLLER WITH REDUCED PIN COUNT; U.S. patent application Ser. No. 08/452,365, entitled SUPPLY AND INTERFACE CONFIGURABLE INPUT/OUTPUT BUFFER; U.S. patent application Ser. No. 08/451,744, entitled CLOCK GENERATION CIRCUIT FOR A DISPLAY CONTROLLER HAVING A FINE TUNEABLE FRAME RATE; U.S. patent application Ser. No. 08/451,206, entitled CONFIGURABLE POWER MANAGEMENT SCHEME; U.S. patent application Ser. No. 08/452,350, entitled BIDIRECTIONAL PARALLEL SIGNAL INTERFACE; U.S. patent application Ser. No. 08/452,094, entitled LIQUID CRYSTAL DISPLAY (LCD) PROTECTION CIRCUIT; U.S. patent application Ser. No. 08/450,156, entitled DISPLAY CONTROLLER CAPABLE OF ACCESSING GRAPHICS DATA FROM A SHARED SYSTEM MEMORY; U.S. patent application Ser. No. 08/450,726, now U.S. Pat. No. 5,541,935, entitled INTEGRATED CIRCUIT WITH TEST SIGNAL BUSES AND TEST CONTROL CIRCUITS; U.S. patent application Ser. No. 08/445,568, entitled DECODE BLOCK TEST METHOD AND APPARATUS.

It should be understood that the invention is not intended to be limited by the specifics of the above-described embodiment, but rather defined by the accompanying claims.

What is claimed is:

1. A method for performing a rotate through carry operation, comprising the sequential steps of:
   a. zero extending an 8 bit shift amount to 32 bits then storing the result in a first register;
   b. loading a second register with zeros;
   c. comparing the least significant 5 bits of the first register to the value one, wherein if equal to one, then setting an overflow flag equal to one, otherwise setting the overflow flag equal to zero;
   d. comparing the least significant 5 bits of the first register to zero, wherein if equal to zero, then setting a zero flag equal to one, otherwise setting the zero flag equal to zero;
   e. comparing the zero flag to zero, wherein if equal to zero, then stop, otherwise go to step f;
   f. comparing the overflow flag to zero, wherein if equal to zero, go to step n, otherwise go to step g;
   g. decrementing by one the value in the first register;
   h. shifting the value in an operand register to the left by one bit position and storing it in a temporary register;
   i. setting the least significant bit of the temporary register equal to a carry flag;
   j. setting the carry flag equal to bit 31 of the operand register if the value in the operand register is a doubleword, otherwise setting the carry flag equal to bit 15 of the operand register if the value in the operand register is a word, otherwise setting the carry flag equal to bit 7 of the operand register if the value in the operand register is a byte;
   k. comparing the least significant 5 bits of the second register to the value one, and comparing the overflow flag to the value one, wherein if either comparison is true, then go to step 1, otherwise go to step m;
   l. setting the overflow flag equal to bit 31 of the operand register XOR bit 31 of the temporary register if the value in the operand register is a doubleword then go to step f, otherwise setting the overflow flag equal to bit 15 of the operand register XOR bit 15 of the temporary register if the value in the operand register is a word the go to step f, otherwise setting the overflow flag equal to bit 7 of the operand register XOR bit 7 of the temporary register if the value in the operand register is a byte then go to step f;

m. comparing the least significant 5 bits of the first register to the value one, wherein if true, then setting the overflow flag equal to one and go to step f, otherwise setting the overflow flag equal to zero and go to step f;

n. decrementing by one the value in the first register;

o. shifting the value in the operand register to the left by one bit position and storing it in the temporary register;

p. setting the least significant bit of the temporary register equal to a carry flag;

q. setting the carry flag equal to bit 31 of the operand register if the value in the operand register is a doubleword, otherwise setting the carry flag equal to bit 15 of the operand register if the value in the operand register is a word, otherwise setting the carry flag equal to bit 7 of the operand register if the value in the operand register is a byte;

r. comparing the least significant 5 bits of the second register to the value one, and comparing the overflow flag to the value one, wherein if either comparison is true, then go to step s, otherwise go to step t;

s. setting the overflow flag equal to bit 31 of the operand register XOR bit 31 of the temporary register if the value in the operand register is a doubleword then go to step u, otherwise setting the overflow flag equal to bit 15 of the operand register XOR bit 15 of the temporary register if the value in the operand register is a word then go to step u, otherwise setting the overflow flag equal to bit 7 of the operand register XOR bit 7 of the temporary register if the value in the operand register is a byte then go to step u;

t. comparing the least significant 5 bits of the first register to the value one, wherein if true, then setting the overflow flag equal to one, otherwise setting the overflow flag equal to zero; and u. loading a destination register with the least significant 8 bits of the temporary register if the operand register is a byte, otherwise loading the destination register with the least significant 16 bits of the temporary register if the operand register is a word, otherwise loading the destination register with the least significant 32 bits of the temporary register if the operand register is a doubleword, then end.

2. A method for performing a rotate through carry operation, comprising the sequential steps of:

a. zero extending an 8 bit shift amount to 32 bits then storing the result in a first register;

b. loading a second register with zeros;

c. comparing the least significant 5 bits of the first register to the value one, wherein if equal to one, then setting an overflow flag equal to one, otherwise setting the overflow flag equal to zero;

d. comparing the least significant 5 bits of the first register to zero, wherein if equal to zero, then setting a zero flag equal to one, otherwise setting the zero flag equal to zero;

e. comparing the zero flag to zero, wherein if equal to zero, then stop, otherwise go to step f;

f. comparing the overflow flag to zero, wherein if equal to zero, go to step n, otherwise go to step g;

g. incrementing by one the value in the first register;

h. shifting the value in an operand register to the right by one bit position and storing it in a temporary register;

i. setting the least significant bit of the temporary register equal to a carry flag;

j. setting the carry flag equal to bit 31 of the operand register if the value in the operand register is a doubleword, otherwise setting the carry flag equal to bit 15 of the operand register if the value in the operand register is a word, otherwise setting the carry flag equal to bit 7 of the operand register if the value in the operand register is a byte;

k. comparing the least significant 5 bits of the second register to the value one, and comparing the overflow flag to the value one, wherein if either comparison is true, then go to step l, otherwise go to step m;

l. setting the overflow flag equal to bit 31 of the operand register XOR bit 31 of the temporary register if the value in the operand register is a doubleword then go to step f, otherwise setting the overflow flag equal to bit 15 of the operand register XOR bit 15 of the temporary register if the value in the operand register is a word the go to step f, otherwise setting the overflow flag equal to bit 7 of the operand register XOR bit 7 of the temporary register if the value in the operand register is a byte then go to step f;

m. comparing the least significant 5 bits of the first register to the value one, wherein if true, then setting the overflow flag equal to one and go to step f, otherwise setting the overflow flag equal to zero and go to step f;

n. incrementing by one the value in the first register;

o. shifting the value in the operand register to the right by one bit position and storing it in the temporary register;

p. setting the least significant bit of the temporary register equal to a carry flag;

q. setting the carry flag equal to bit 31 of the operand register if the value in the operand register is a doubleword, otherwise setting the carry flag equal to bit 15 of the operand register if the value in the operand register is a word, otherwise setting the carry flag equal to bit 7 of the operand register if the value in the operand register is a byte;

r. comparing the least significant 5 bits of the second register to the value one, and comparing the overflow flag to the value one, wherein if either comparison is true, then go to step s, otherwise go to step t;

s. setting the overflow flag equal to bit 31 of the operand register XOR bit 31 of the temporary register if the value in the operand register is a doubleword then go to step u, otherwise setting the overflow flag equal to bit 15 of the operand register XOR bit 15 of the temporary register if the value in the operand register is a word then go to step u, otherwise setting the overflow flag equal to bit 7 of the operand register XOR bit 7 of the temporary register if the value in the operand register is a byte then go to step u;

t. comparing the least significant 5 bits of the first register to the value one, wherein if true, then setting the overflow flag equal to one, otherwise setting the overflow flag equal to zero; and u. loading a destination register with the least significant 8 bits of the temporary register if the operand register is a byte, otherwise loading the destination register with the least significant 16 bits of the temporary register if the operand register is a word, otherwise loading the destination register with the least significant 32 bits of the temporary register if the operand register is a doubleword, then end.

* * * * *